US009447234B2

(12) United States Patent
Lee et al.

(10) Patent No.: US 9,447,234 B2
(45) Date of Patent: Sep. 20, 2016

(54) HIGH MOLECULAR WEIGHT ALIPHATIC POLYCARBONATE COPOLYMER AND PREPARATION METHOD THEREOF

(71) Applicant: LOTTE CHEMICAL CORPORATION, Seoul (KR)

(72) Inventors: Bun Yeoul Lee, Suwon-si (KR); Jong Yeob Jeon, Chungcheongnam-do (KR); Jung Jae Lee, Suwon-si (KR); Ji Hae Park, Hwaseong-si (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 14/440,877

(22) PCT Filed: May 28, 2013

(86) PCT No.: PCT/KR2013/004637
§ 371 (c)(1),
(2) Date: May 6, 2015

(87) PCT Pub. No.: WO2014/073764
PCT Pub. Date: May 15, 2014

(65) Prior Publication Data
US 2015/0291735 A1     Oct. 15, 2015

(30) Foreign Application Priority Data

Nov. 9, 2012 (KR) ........................ 10-2012-0126445

(51) Int. Cl.
| C08G 64/00 | (2006.01) |
| C08G 64/06 | (2006.01) |
| C08G 63/64 | (2006.01) |
| C08G 64/02 | (2006.01) |
| C08G 64/30 | (2006.01) |
| C08G 63/02 | (2006.01) |

(52) U.S. Cl.
CPC ............... C08G 64/06 (2013.01); C08G 63/64 (2013.01); C08G 64/0208 (2013.01); C08G 64/305 (2013.01)

(58) Field of Classification Search
CPC ........................ C08G 63/78; C08G 63/183
USPC ...................... 528/196, 198, 308.8
See application file for complete search history.

(56) References Cited

U.S. PATENT DOCUMENTS

| 5,070,172 | A | 12/1991 | Yokota et al. |
| 5,171,830 | A | 12/1992 | Grey |
| 5,962,622 | A | 10/1999 | Darnell et al. |
| 6,559,270 | B1 | 5/2003 | Siclovan et al. |
| 6,767,986 | B2 | 7/2004 | Moethrath et al. |
| 2001/0047073 | A1 | 11/2001 | Mizia et al. |
| 2003/0009047 | A1 | 1/2003 | Tillack et al. |
| 2009/0105443 | A1* | 4/2009 | Brack ............... C08G 64/305 528/190 |
| 2010/0041856 | A1 | 2/2010 | Gross et al. |
| 2010/0292497 | A1 | 11/2010 | Masubuchi et al. |
| 2011/0190471 | A1 | 8/2011 | Watanabe |
| 2014/0296473 | A1 | 10/2014 | Fuji et al. |

FOREIGN PATENT DOCUMENTS

| DE | 1031512 B | 6/1958 |
| EP | 0302712 A2 | 2/1989 |
| EP | 1134248 B1 | 8/2005 |
| EP | 2036937 A1 | 3/2009 |
| EP | 1874846 B1 | 6/2011 |
| EP | 2033981 B1 | 8/2013 |
| JP | 08-143656 A | 6/1996 |
| KR | 10-1998-0061620 A | 10/1998 |
| KR | 10-2004-0030711 A | 4/2004 |
| KR | 100853358 B1 | 8/2008 |

OTHER PUBLICATIONS

International Search Report for PCT/KR2013/004637 mailed Sep. 11, 2013 from Korean Intellectual Property Office.
A.P. Pego et al., "Enhanced mechanical properties of 1,3-trimethylene carbonate polymers and networks", Polymer 44 (2003) 6495-6504.
Yoshio Yamamoto et al.,"High-Molecular-Weight Polycarbonates Synthesized by Enzymatic ROP of a Cyclic Carbonate as a Green Process", Macromol. Biosci. 2009, 9, 968-978.
Foy, Farrell, and Higginbotham, "Synthesis of Linear Aliphatic Polycarbonate Macroglycols Using Dimethylcarbonate", Journal of Applied Polymer Science, vol. 111, 217-227 (2009).
Yue Xia Feng et al.,"Environmentally Benign Route for the Synthesis of Polycarbonate Diols (PCDLs)-Calcined MgAl Hydrotalcites as Heterogeneous Catalysts", Ind. Eng. Chem. Res. 2008, 47, 2140-2145.
J. Pokharkar and S. Sivaram,"Poly(alkylene carbonate)s by the carbonate interchange reaction of aliphatic diols with dimethyl carbonate: synthesis and characterization", Polymer vol. 36 No. 25 1995 , 4851-4854.
W Zhu, et al., "High-molecular-weight aliphatic polycarbonates by melt polycondensation of dimethyl carbonate and aliphatic diols:synthesis and characterization", Polym Int 2011; 60: 1060-1067.
Zhu, et al., "Synthesis, Characterization and Degradation of Novel Biodegradable Poly(butylene-co-hexamethylene carbonate) Copolycarbonates", Journal of Macromolecular Science, Part A: Pure and Applied Chemistry (2011) 48, 583-594.
J. Feng et al., "Construction of functional aliphatic polycarbonates for biomedical applications", Progress in Polymer Science 37 (2012) 211-236.

(Continued)

Primary Examiner — Terressa Boykin
(74) Attorney, Agent, or Firm — STIP Law Group, LLC

(57) ABSTRACT

Provided is an aliphatic polycarbonate copolymer including repeating units of Formula 1 described in the specification. In Formula 1, A is a substituted or unsubstituted $C_3$-$C_{60}$ alkylene or a substituted or unsubstituted $C_3$-$C_{60}$ heteroalkylene and the O-A-O units in one polymer chain may be identical to or different from each other, B is a substituted or unsubstituted $C_5$-$C_{20}$ arylene or a substituted or unsubstituted $C_5$-$C_{20}$ heteroarylene and the —C(O)—B—C(O)— units in one polymer chain may be identical to or different from each other, and x and y are real numbers representing mole fractions.

15 Claims, 1 Drawing Sheet

(56) References Cited

OTHER PUBLICATIONS

Zhaozhong Jiang, "Lipase-Catalyzed Copolymerization of Dialkyl Carbonate with 1,4-Butanediol and ω-Pentadecalactone: Synthesis of Poly-(ω-pentadecalactone-co-butylene-co-carbonate)", Biomacromolecules 2011, 12, 1912-1919.

B. Fernandez d'Arlas et al., "Kinetic and thermodynamic studies of the formation of a polyurethane based on 1,6-hexamethylene diisocyanate and poly(carbonate-co-ester)diol", Thermochimica Acta 459 (2007) 94-103.

Jiang et al., "Lipase-Catalyzed Synthesis of Aliphatic Poly(carbonate-co-esters)", Macromolecules 2008, 41, 4671-4680.

Zini et al., "Aliphatic Polyester Carbonate Copolymers: Enzymatic Synthesis and Solid-State Characterization", Macromolecules 2008, 41, 4681-4687.

Xiuli Hu et al., "Aliphatic Poly(ester-carbonate)s Bearing Amino Groups and Its RGD Peptide Grafting", Journal of Polymer Science: Part A: Polymer Chemistry, vol. 46, 7022-7032 (2008).

* cited by examiner

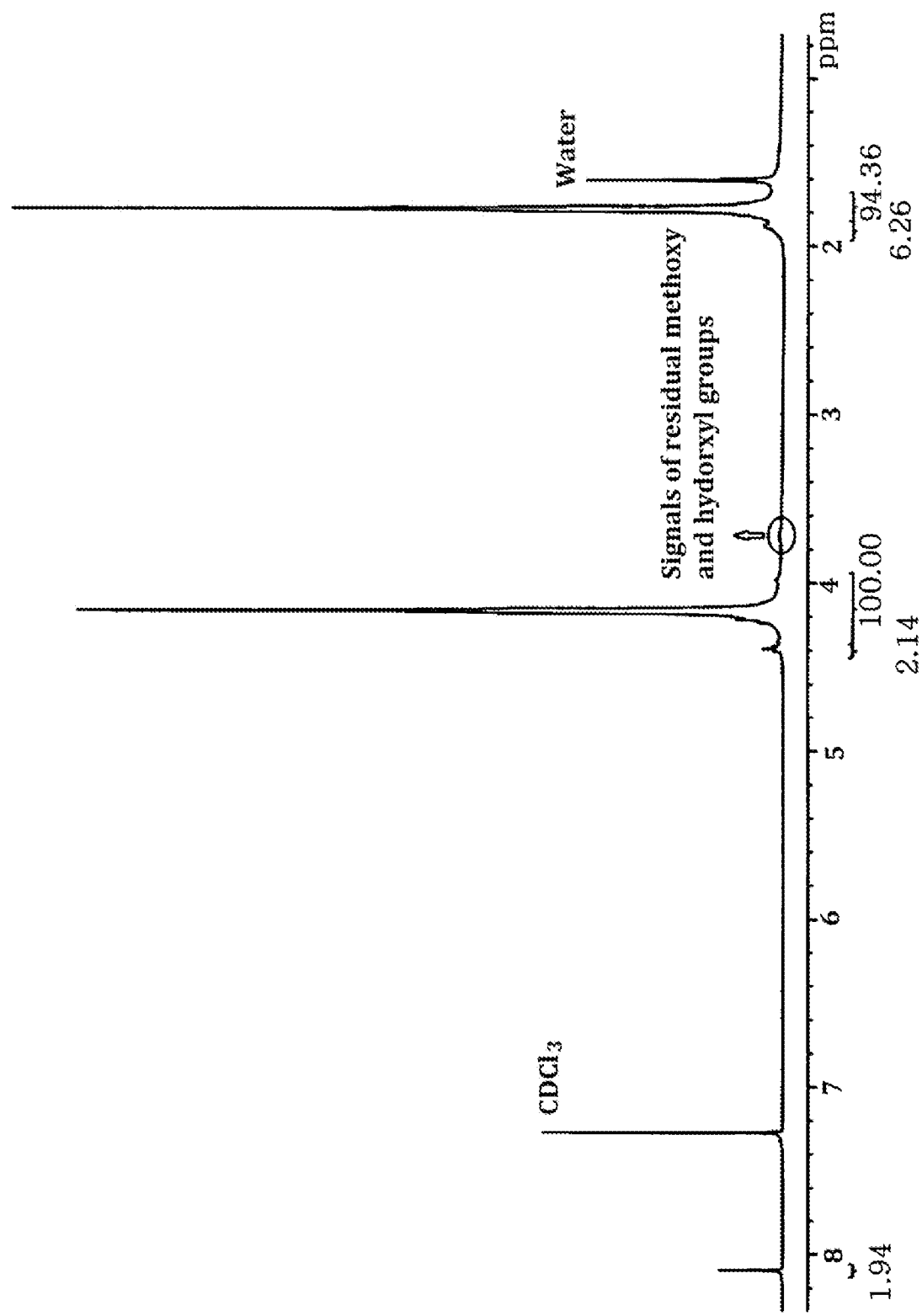

HIGH MOLECULAR WEIGHT ALIPHATIC POLYCARBONATE COPOLYMER AND PREPARATION METHOD THEREOF

CROSS REFERENCE TO PRIOR APPLICATIONS

This application is a National Stage Application of PCT International Patent Application No. PCT/KR2013/004637 filed on May 28, 2013, under 35 U.S.C. §371, which claims priority to Korean Patent Application No. 10-2012-0126445 filed on Nov. 9, 2012, which are all hereby incorporated by reference in their entirety.

TECHNICAL FIELD

The present invention relates to a high molecular weight aliphatic polycarbonate copolymer and a method for preparing the same.

BACKGROUND ART

Aliphatic polycarbonates are biodegradable eco-friendly polymers. Poly(ethylene carbonate) and poly(propylene carbonate) as aliphatic polycarbonates can be prepared via alternating copolymerization of carbon dioxide as a monomer with the corresponding epoxide. The use of carbon dioxide is of great environmental value (Reaction 1). A catalyst with ultrahigh activity for carbon dioxide/epoxide copolymerization reaction was developed by the present inventors and is currently ready for commercialization under the trademark Green Pol (Korean Patent No. 10-0853358). The number of carbon atoms in the carbonate linking groups of aliphatic polycarbonates prepared via dioxide/epoxide copolymerization is limited to 2. Poly(ethylene carbonate) and poly(propylene carbonate) as representative aliphatic polycarbonates have limited physical properties, such as low glass transition temperatures of 40° C. and 20° C., respectively, and lack of crystallinity.

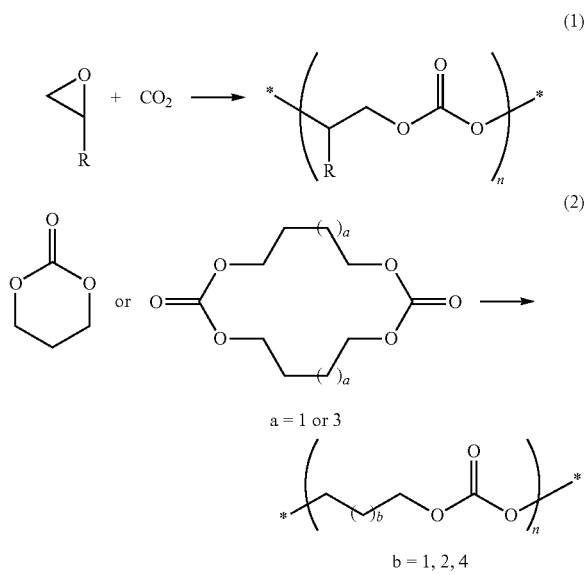

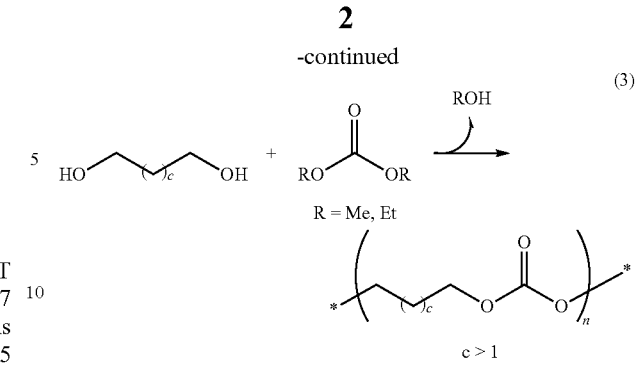

Aliphatic polycarbonates whose carbonate linkers each has three or more carbon atoms can be prepared via ring-opening polymerization of the corresponding cyclic compounds (Reaction 2). Such ring-opening polymerization has the advantages that no by-products are formed and final polymers have high molecular weights (e.g., weight average molecular weights of several hundreds of thousands (Pego A P, Grijpma D W and Feijen J, *Polymer* 2003, 44, 6495-6504); Yamamoto Y, Kaihara S, Toshima K and Matsumura S, *Macromol. Biosci.* 2009, 9, 968-978). However, the monomeric cyclic compounds are not easy to produce and their use is thus not suitable for the commercialization of aliphatic polycarbonates. That is, the trimethylene carbonate shown in Reaction 2 is currently sold at a price of about 158,000 won per 50 g by Aldrich and is thus unsuitable for use as a monomer for the preparation of general-purpose polymers. The (tetramethylene carbonate) dimer and (hexamethylene carbonate) dimer are not distributed in the market and are produced through complicated isolation and purification processes using enzymes. Accordingly, the use of the dimers is inappropriate for mass production of aliphatic polycarbonates on a commercial scale.

The most appropriate method for mass production of aliphatic polycarbonates whose carbonate linkers each has three or more carbon atoms is associated with the condensation of dimethyl carbonate or diethyl carbonate and various diols (Reaction 3). Dimethyl carbonate and diethyl carbonate are inexpensive compounds that have been produced from phosgene. Efforts have been made to develop processes for the production of dimethyl carbonate and diethyl carbonate using carbon monoxide or carbon dioxide instead of toxic phosgene. The use of environmentally friendly carbon dioxide is more advantageous. Dimethyl carbonate and diethyl carbonate produced by these processes are in practical use at present.

There are many reports in the literature on the preparation of aliphatic polycarbonates via the condensation reaction shown in Reaction 3. However, Reaction 3 for the preparation of aliphatic polycarbonates is slow and has a limitation in increasing the molecular weight of the final polymers. No prior art process is disclosed for preparing high molecular weight aliphatic polycarbonates in an easy manner. Oligomeric macrodiols having —OH groups at both terminals are currently produced and used for polyurethane production. It was reported that macrodiols having a molecular weight as low as ≤2,000 can be produced by condensation of 1,4-butanediol, 1,5-pentanediol, and 1,6-hexanediol with dimethyl carbonate (DMC) using a calcium catalyst (*J. Appl. Polym. Sci.* 2009, 111, 217-227). However, the overall reaction time is as long as 36 hours. According to a recent report, macrodiols having a low molecular weight on the order of 1,000 can be produced through a condensation reaction between 1,6-hexanediol and DMC using calcined MgAl hydrotalcites as solid bases (*Ind. Eng. Chem. Res.* 2008, 47, 2140-2145). In this case as well, the reaction time (≥12 hours) is long. Other reports are also found in the literature on the synthesis of macrodiols with a molecular weight of several thousands and the production of polyurethane using the macrodiols (U.S. Patent Publication No. 2010/0292497; EP 302712; EP 1874846). The synthesis of the macrodiols usually requires a long reaction time of at least 10 hours.

Efforts have also been made to prepare high molecular weight aliphatic polycarbonates. Sivaram et al. reported the preparation of aliphatic polycarbonates having a weight average molecular weight of 6,000 to 25,000 by condensation of DMC with various diols (e.g., 1,4-butanediol, 1,6-hexanediol, 1,8-octanediol, and 1,4-bis(hydroxymethyl)cyclohexane) using 1,3-diphenoxytetra-n-butyldistannoxane as a catalyst (*Polymer* 1995, 36, 4851-4854). The overall reaction time is 11 hours and the reaction temperature is raised to 220° C. The reaction is carried out via a two-step process to increase the molecular weight of the polymers. After step 1, each reaction product is dissolved in methylene chloride and washed with water to remove unreacted diol compound. That is, as a strategy to increase the molecular weights of the polymers, oligomers end-capped with methyl carbonate having a low solubility in water are subjected to a condensation reaction while removing DMC in step 2. U.S. Pat. No. 5,171,830 discloses a process for the preparation of aliphatic polycarbonates including condensing DMC with various diols using a tertiary amine or alkylammonium salt as a catalyst. According to a representative example of this patent, 1,4-butanediol is reacted with excess DMC at 150° C. for 8 hours to prepare mono- or bis(methyl carbonate) esters of 1,4-butanediol and a condensation reaction of the mono- or bis(methyl carbonate)esters is induced while removing volatiles under vacuum or reduced pressure at an elevated temperature up to 200° C. to increase the molecular weight of the polymer. However, the molecular weights of the polymers prepared by this process are only on the order of 2,400 and the end groups of the polymers are capped with methyl carbonate. Recently, Chuncheng Li et al. reported that polymers with a weight average molecular weight of a maximum of 170,000 can be obtained by condensation of DMC and 1,4-butanediol using a $TiO_2/SiO_2$/poly(vinyl pyrrolidone) mixture as a solid catalyst (*Polym. Int.* 2011, 60, 1060-1067; *J. Macrom. Sci. Part A: Pure Appl. Chem.* 2011, 48, 583-594). The overall reaction time is about 10 hours. They took a strategy to increase the molecular weight of the polymers by preparing oligomers end-capped with methyl carbonate in step 1 and inducing a condensation reaction of the oligomers while removing DMC in step 2. The creation of vacuum or reduced pressure at a high temperature of 200° C. is absolutely required to increase the molecular weights of the polymers. However, under these temperature and pressure conditions, tetrahydrofuran (THF) is formed as a by-product. A high reaction temperature of 200° C. is absolutely important in increasing the molecular weights of the polymers. When the condensation reaction temperature is 190° C. at which no THF by-products are formed, the weight average molecular weights of the polymers are as low as 60,000.

In EP 1134248, pointing to the fact that there is a limitation in preparing high molecular weight aliphatic polycarbonates by condensation of DMC and diols, an attempt to use aliphatic polycarbonate-diols with a molecular weight on the order of 1,000, which have been used for polyurethane production, was made to prepare polymers with a higher molecular weight. Specifically, the aliphatic polycarbonate-diols are condensed with diphenol carbonate (DPC) while removing phenol to increase the molecular weight of the final polymers. Despite this attempt, the molecular weight of the polymers is only on the order of 3,000. DE 1031512 reported a process for preparing poly (hexamethylene carbonate) with a molecular weight on the order of 25,000 by condensation of a low molecular weight aliphatic polycarbonate-diol and phenyl chloroformate at 250° C. However, the use of toxic expensive materials such as phenyl chloroformate makes the process less attractive. Further, the reaction temperature is too high, posing a danger that a considerable amount of THF may be formed from 1,4-butanediol.

Some reports have been published on the synthesis of aliphatic polycarbonates using more reactive diphenol carbonate (DPC) instead of less reactive DMC (U.S. Pat. No. 6,767,986; EP 2033981; EP 2036937). However, taking into consideration that DPC is produced with a low conversion rate from DMC, the use of DPC rather than DMC would not be preferable in condensation reactions for the preparation of aliphatic polycarbonates.

DETAILED DESCRIPTION OF THE INVENTION

Problems to be Solved by the Invention

The present invention is intended to provide a high molecular weight aliphatic polycarbonate copolymer having a new chain structure and a method for preparing the aliphatic polycarbonate copolymer.

Means for Solving the Problems

According to one aspect of the present invention, there is provided an aliphatic polycarbonate copolymer including repeating units of Formula 1:

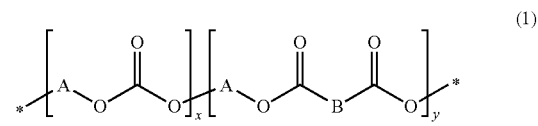

wherein A is a substituted or unsubstituted $C_3$-$C_{60}$ alkylene or a substituted or unsubstituted $C_3$-$C_{60}$ heteroalkylene and the O-A-O units in one polymer chain may be identical to or different from each other, B is a substituted or unsubstituted $C_5$-$C_{20}$ arylene or a substituted or unsubstituted $C_5$-$C_{20}$ heteroarylene and the —C(O)—B—C(O)— units in one polymer chain may be identical to or different from each other, and x and y are real numbers representing mole fractions.

The aliphatic polycarbonate copolymer may be a block or random copolymer, typically a random copolymer.

The term "alkyl" used herein is intended to include straight chained, branched, and cyclic hydrocarbon radicals. The term "alkylene" refers to a divalent radical derived from alkyl. For example, the alkylene includes methylene, ethylene, isobutylene, cyclohexylene, cyclopentylethylene, 2-prophenylene, and 3-butynylene.

The term "heteroalkyl", by itself or in combination with another term means, unless otherwise stated, a stable straight chained, branched, cyclic hydrocarbon radicals, or combinations thereof, consisting of the stated number of carbon atoms and one or more heteroatoms selected from the group consisting of O, N, P, Si, and S, and wherein the nitrogen, phosphorus, and sulfur atoms may optionally be oxidized and the nitrogen heteroatom may optionally be quaternized. Similarly, the term "heteroalkylene" refers to a divalent radical derived from heteroalkyl.

The term "aryl" means, unless otherwise stated, a polyunsaturated, aromatic, hydrocarbon substituent which can be a single ring or multiple rings (from 1 to 3 rings) which are fused together or linked covalently. The term "heteroaryl" refers to aryl groups (or rings) that contain from one to four heteroatoms (in each separate ring in the case of multiple rings) selected from N, O, and S, wherein the nitrogen and sulfur atoms are optionally oxidized, and the nitrogen atom(s) are optionally quaternized. The heteroaryl group can be attached to the remainder of the molecule through a carbon or heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolinyl, 5-isoquinolinyl, 2-quinoxalinyl, 5-quinoxalinyl, 3-quinolyl, and 6-quinolyl. Substituents for each of the above-mentioned aryl and heteroaryl groups are selected from the group of acceptable substituents described below. The terms "arylene" and "heteroarylene" refer to divalent radicals of aryl and heteroaryl, respectively.

The term "substituted" in the expression of "substituted or unsubstituted" described herein means that one or more hydrogen atoms in the hydrocarbon are each independently replaced by the same or different substituents.

Suitable substituents include, but are not limited to, —$R^a$, -halo, —$O^-$, =O, —$OR^b$, —$SR^b$, —$S^-$, =S, —$NR^cR^c$, =$NR^b$, =N—$OR^b$, trihalomethyl, —$CF_3$, —CN, —OCN, —SCN, —NO, —$NO_2$, =$N_2$, —$N_3$, —$S(O)_2R^b$, —$S(O)_2NR^b$, —$S(O)_2O^-$, —$S(O)_2OR^b$, —$OS(O)_2R^b$, —OS$(O)_2O^-$, —$OS(O)_2OR^b$, —$P(O)(O^-)_2$, —$P(O)(OR^b)(O^-)$, —$P(O)(OR^b)(OR^b)$, —$C(O)R^b$, —$C(S)R^b$, —$C(NR^b)R^b$, —$C(O)O^-$, —$C(O)OR^b$, —$C(S)OR^b$, —$C(O)NR^cR^c$, —$C(NR^b)NR^cR^c$, —$OC(O)R^b$, —$OC(S)R^b$, —$OC(O)O^-$, —$OC(O)OR^b$, —$OC(S)OR^b$, —$NR^bC(O)R^b$, —$NR^bC(S)R^b$, —$NR^bC(O)O^-$, —$NR^bC(O)OR^b$, —$NR^bC(S)OR^b$, —$NR^bC(O)NR^cR^c$, —$NR^bC(NR^b)R^b$, and —$NR^bC(NR^b)NR^cR^c$, where $R^a$ is selected from the group consisting of alkyl, cycloalkyl, heteroalkyl, cycloheteroalkyl, aryl, arylalkyl, heteroaryl, and heteroarylalkyl groups; each $R^b$ is independently hydrogen or $R^a$; each $R^c$ is independently $R^b$, with the proviso that the two $R^c$ groups, together with the nitrogen atom to which they are attached, may form a 4-, 5-, 6- or 7-membered cycloheteroalkyl and may optionally include 1 to 4 identical or different additional heteroatoms selected from the group consisting of O, N, and S. As a specific example, —$NR^cR^c$ is meant to include —$NH_2$, —NH-alkyl, N-pyrrolidinyl, and N-morpholinyl. As another example, the substituted alkyl is meant to include -alkylene-O-alkyl, -alkylene-heteroaryl, -alkylene-cycloheteroalkyl, -alkylene-C(O)$OR^b$, -alkylene-C(O)$NR^bR^b$, and —$CH_2$—$CH_2$—C(O)—$CH_3$. The one or more substituents, together with the atoms to which they are attached, may optionally form cyclic rings including cycloalkyl and cycloheteroalkyl.

The copolymer having the above structure is a compound within the scope of copolymers called poly(carbonate-co-esters). There are some reports regarding the preparation of poly(carbonate-co-esters). For example, a poly(carbonate-co-ester) may be prepared by further adding a lactone compound during the preparation of an aliphatic polycarbonate via ring-opening polymerization of Reaction 2 in the Background Art (*Prog. Polym. Sci.* 2012, 37, 211-236; *J. Polym. Sci.: Part A: Polym. Chem.* 2008, 46, 7022-7032). As another example, a poly(carbonate-co-ester) may be prepared by further adding a lactone compound during the condensation process of Reaction 3 in the Background Art (*Biomacromolecules* 2011, 12, 1912-1919; *Thermochimica Acta* 2007, 459, 94-103). However, the poly(carbonate-co-esters) prepared using the lactone compounds include no aromatic rings and are different from the structure of Formula 1 claimed in the present invention including a group derived from an aromatic dicarboxylic acid.

There is a report on the preparation of poly(butylene carbonate-co-butylene succinate) by reacting a mixture of dimethyl succinate and DPC with 1,4-butanediol in the presence of zinc acetate as a catalyst and inducing a condensation reaction while removing by-produced methanol and phenol (Japanese Patent JP08143656 (A2), 1996). The reaction is carried out at a high temperature of 220° C., which may cause the occurrence of side reactions and the formation of toxic phenol.

Many efforts to solve such problems have been made in recent years. For example, it was reported that aliphatic poly(carbonate-co-esters), such as poly(butylene carbonate-co-butylene succinate) and poly(hexamethylene carbonate-co-hexamethylene adipate), are prepared by condensation of diethyl carbonate, an aliphatic diester, and an aliphatic diol using enzymes (*Macromolecules* 2008, 41, 4671-4680; *Macromolecules* 2008, 41, 4681-4687; U.S. Patent Publication No. 2010/0041856). The reaction requires a total of 70 hours for completion and the copolymers have a weight average molecular weights of up to 60,000.

However, the copolymer including the repeating units of Formula 1 claimed in the present invention is a compound prepared by condensation of an aliphatic diol compound with a mixture of an aromatic diester and DMC and is novel because it includes aromatic dicarboxyl groups as the repeating units. No report has appeared on poly(carbonate-co-esters) consisting of aliphatic carbonate groups and aromatic ester groups. The present invention proposes a method for preparing poly(carbonate-co-esters) consisting of high molecular weight aliphatic carbonate groups and aromatic ester groups, which will be provided below. Poly(butylene carbonate-co-butylene adipate) as a poly(carbonate-co-ester) consisting of aliphatic carbonate groups and aliphatic ester groups may be prepared by the method proposed in the present invention. The poly(butylene carbonate-co-butylene adipate) thus prepared is likely to gel. That is, the introduction of aromatic diester groups facilitates the preparation of high molecular weight aliphatic polycarbonate copolymers.

According to a particular embodiment of the present invention, the copolymer including the repeating units of Formula 1 has a high molecular weight, specifically a weight average of molecular weight of at least 50,000 or at least 100,000. As described in the Background Art, there is a limitation in increasing the molecular weight of existing aliphatic polycarbonates. The present inventors have found that the introduction of aromatic diester repeating units enables the preparation of high molecular weight polymers (see the preparation processes and Examples Section that follow).

According to the following Examples Section, copolymers including the repeating units of Formula 1 wherein the mole fraction of y (i.e. y/(x+y)) is from 1% to 50% are easily prepared.

The copolymer including the repeating units of Formula 1 can be prepared by condensation of HO-A-OH as an aliphatic diol with $HO_2C$—B—$CO_2H$ as a raw material for an aromatic diester. Specifically, the HO-A-OH is selected from compounds of Formulae 2a to 2d:

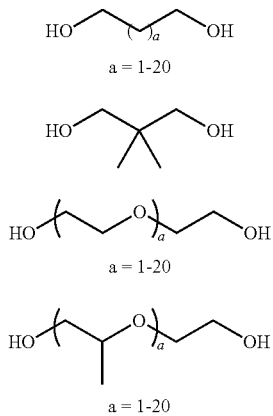

The O-A-O units in one chain may be identical to or different from each other.

The $HO_2C$—B—$CO_2H$ can be selected from the compounds of Formulae 3a to 3d:

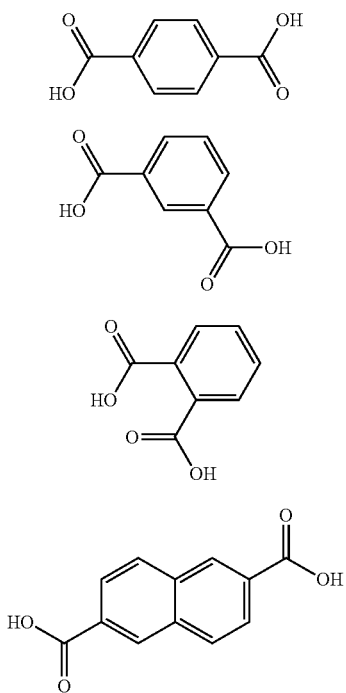

These compounds are readily commercially available at reasonable prices.

The compound of Formula 2a wherein a is 2 is 1,4-butanediol. 1,4-Butanediol is currently produced on an industrial scale and can be used for the preparation of biodegradable polymers, such as poly(butylene succinate) and poly(butylene succinate adipate). Accordingly, 1,4-butanediol is the most suitable diol for use in the present invention. The compound of Formula 3a is terephthalic acid. Terephthalic acid is currently produced on an industrial scale and can be used as a monomer for the production of polyethylene terephthalate (PET). Accordingly, terephthalic acid is the most suitable dicarboxylic acid for use in the present invention.

According to a further aspect of the present invention, there is provided a method for preparing a high molecular weight aliphatic polycarbonate in an effective manner. The method of the present invention includes the following two steps. In step 1, a mixture of a diol compound represented by HO-A-OH and a dialkyl carbonate is heated to or above the boiling point of the dialkyl carbonate in the presence of a base catalyst. The condensation reaction is allowed to proceed while removing an alcohol by-product. In step 2, the reaction product of step 1 is allowed to further react while distilling off volatiles by distillation under reduced pressure at high temperature. In step 2, the conversion of the reaction product is maximized.

The molar ratio of the hydroxyl groups to the alkoxy groups in the reaction product of step 1 is controlled to the range of 1:1 to 1:1.3. Within this range, the conversion can be maximized. The molar ratio of the hydroxyl groups to the alkoxy groups is maintained close to 1:1 in the reaction of step 2. As a result, the final polymer has a weight average molecular weight of at least 50,000. Herein, A is a substituted or unsubstituted $C_3$-$C_{60}$ alkylene or a substituted or unsubstituted $C_3$-$C_{60}$ heteroalkylene and the final polymer includes repeating units having a structure represented by —[OC(O)O-A]-. The O-A-O units in one polymer chain may be identical to or different from each other. Preferably, each alkyl group of the dialkyl carbonate is selected from the group consisting of methyl, ethyl, propyl, and combinations thereof.

In a preferred embodiment, the method for preparing an aliphatic polycarbonate includes: condensing a mixture of HO-A-OH, including HO-A-O$^-$M$^+$, with DMC by heating to 90° C. or more while distilling off by-produced methanol and a portion of the DMC to obtain a mixture in which the molar ratio of the —OH functional groups to the —OCH$_3$ functional groups is 1:1-1.3 (step 1); and condensing the mixture obtained in step 1 while removing volatiles under reduced pressure at an elevated temperature of at least 150° C. to maximize the conversion rate of the reaction (step 2). The aliphatic polycarbonate has a weight average molecular weight of at least 50,000 and includes repeating units having a structure of —[OC(O)O-A]-.

Herein, M$^+$ is an alkali metal cation or an ammonium cation and A is a substituted or unsubstituted $C_3$-$C_{60}$ alkylene or a substituted or unsubstituted $C_3$-$C_{60}$ heteroalkylene and the O-A-O units in one polymer chain may be identical or different from each other. The molar ratio of HO-A-OH: M$^+$ is 100:0.1-1.

The HO-A-O$^-$M$^+$ is easily prepared by adding various bases (e.g., MOH, MOMe, MH, and MNH$_2$) to the HO-A-OH.

The molecular weight of the condensation product of the aliphatic diol and DMC can be increased by Reaction 1a in which methanol is formed as a by-product, Reaction 1b in which DMC is formed, and Reaction 1c in which a diol is formed.

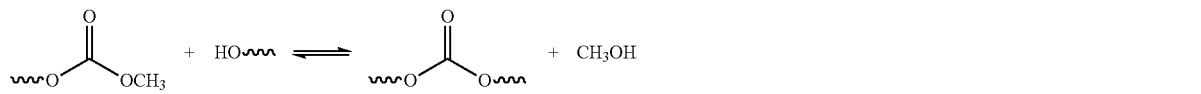

(1a)

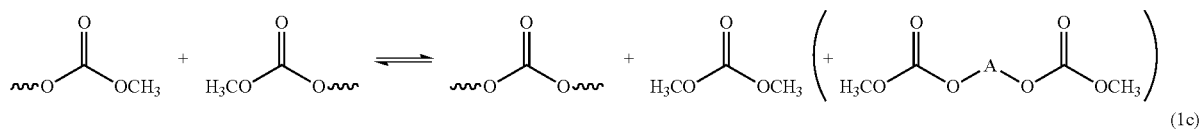

(1b)

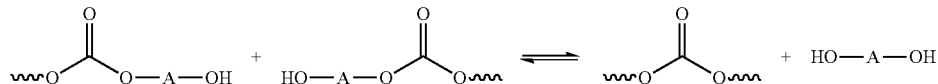

(1c)

The three reactions all are reversible and the molecular weight of the condensation product increases when the by-products are removed. Methanol and DMC are easy to remove due to their low boiling points (65° C. and 90° C., respectively) and the molecular weight of the condensation product can be increased through Reactions 1a and 1b. When the diol with a low molecular weight is removed under vacuum or reduced pressure, the molecular weight of the condensation product can be increased through Reaction 1c.

The molecular weight of the condensation product is determined by the degree of polymerization (DP) thereof. The DP of the condensation product is given by Carothers equation: DP=(1+r)/(1−r−2rp) (where r is the ratio of the two functional groups reacting with each other and p is the conversion rate). A higher degree of polymerization is obtained when the conversion rate is maximized and the molar ratio of the two functional groups approaches 1:1. That is, when both r and p are very close to 1, a greater DP value is obtained, indicating a higher molecular weight of the final polymer. A high conversion rate can be accomplished when the reaction time or temperature increases. However, it is not easy to control the two functional groups to have the same number of moles. This often serves as a factor limiting the preparation of a higher molecular weight polymer by a condensation reaction. In the equation, when r is 0.98 slightly smaller than 1, DP is limited to 99, which is not a very large value, although the conversion rate is 100%. Even when precisely controlled amounts of the two monomers are added, the monomers may be partially decomposed during the reaction, may be stuck to the reactor wall, thus failing to participate in the reaction, or their purities may be slightly lowered. In this case, r may be distant from 1. For this reason, instead of preparing polyethylene terephthalate (PET) by condensation of equimolar amounts of terephthalic acid and ethylene glycol, PET with a higher molecular weight is prepared through two steps, as depicted in Reaction Scheme 2:

(2)

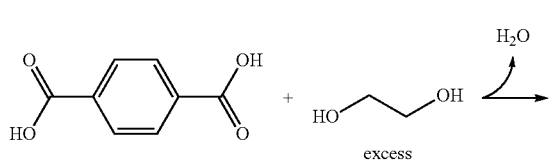

-continued

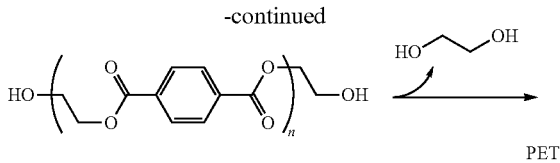

PET

Specifically, excess ethylene glycol is allowed to react with terephthalic acid to obtain an oligomer whose both end groups are capped with hydroxyl groups (step 1) and condensing the oligomer while removing ethylene glycol by distillation under reduced pressure at high temperature to increase the molecular weight of the final polymer (step 2).

A similar strategy was also taken in an attempt to prepare a high molecular weight aliphatic polycarbonate. Specifically, first, a diol is allowed to react with excess DMC to prepare an oligomer whose both end groups are capped with methyl carbonate groups and condensing the oligomer while removing DMC formed by Reaction 1b, achieving increased molecular weight of the final polymer. An advantage of this strategy is that the DMC is easy to remove due to its low boiling point (90° C.). Sivaram et al. separated the oligomer end-capped with methyl carbonate groups after step 1, followed by the subsequent reaction of the oligomer (*Polymer* 1995, 36, 4851-4854). In U.S. Pat. No. 5,962,622, a strategy was took to convert a diol to bis(methyl carbonate) and isolate and purify the bis(methyl carbonate) to increase the molecular weight of a final polymer through Reaction 1b. U.S. Pat. No. 5,171,830 also attempted to prepare mono- or bis-(methyl carbonate) of 1,4-butanediol, followed by condensation in step 2 to increase the molecular weight of a final polymer. Chuncheng Li et al. states in their paper that they took a strategy to increase the molecular weight of a final polymer through Reaction 1b. Most attempts based on this strategy failed to prepare aliphatic polycarbonates having a weight average molecular weight of 50,000 or more. Chuncheng Li et al. reported successful preparation of a polymer having a weight average molecular weight of 170,000. However, they used a complex catalyst system composed of SiO$_2$/TiO$_2$/polypyrrolidone, unlike the present invention, and carried out a reaction at a high temperature of 200° C., resulting in the formation of by-products, such as THF (see the Background Art). A high reaction temperature of 200° C. is absolutely important in increasing the molecular weight of final polymers. When the condensation reaction temperature is lowered from 200° C. to 190° C. by 10° C., the weight average molecular weight is reduced to 60,000.

The present inventors were aware that when the reaction proceeds to a considerable extent, the —OH groups disappear, only a portion of the —OCH₃ groups remain unreacted, and as a result, the rate of Reaction 1b is very low in the presence of a base catalyst, making it difficult to increase the molecular weight of a final polymer (see Comparative Example 1). Thus, the present inventors took the strategy described above, which is distinguished from conventional methods for the preparation of high molecular weight aliphatic polycarbonates.

According to the method of the present invention, the condensation reaction is allowed to proceed using a base catalyst while removing methanol formed through Reaction 1a by distillation at ambient pressure (step 1). In this step, the methanol forms an azeotropic mixture with DMC, and as a result, the DMC together with a portion of the methanol is distilled off. The amount of the DMC removed together with the methanol is affected by the reactor design, such as the height of a distillation column, and the reaction conditions, such as reaction temperature. Thus, it is impossible to accurately adjust the molar ratio between the two functional groups resulting from the molar ratio between the HO-A-OH and DMC added in the initial stage of the reaction, making it difficult to obtain a high molecular weight of the aliphatic polycarbonate using DMC. In contrast, in the case where an aromatic polycarbonate is prepared using DPC, such problems are not encountered because of the high boiling point of DPC, and as a result, the molar ratio between the two functional groups can be controlled by the addition of DPC and an aryldiol in the initial stage of the reaction, making it easy to obtain a high molecular weight of the polymer after condensation.

The present invention features that the HO-A-OH and DMC are subjected to a condensation reaction under heating at 90° C. or more at ambient pressure in the presence of a base catalyst while distilling off by-produced methanol and a portion of the DMC, to obtain a mixture in which the —OH functional groups and the —OCH₃ functional groups are in a molar ratio of 1:1-1.3 (step 1), and the mixture is heated under reduced pressure (step 2). The reaction rate of the DMC and the diol in the presence of a base catalyst is very slow at a low temperature. Although a higher temperature is more advantageous for the reaction, it is not easy to raise the initial reaction temperature to 90° C. or more because the boiling point of DMC is 90° C. It is preferred that the reactants are heated to reflux at 90° C. in the initial stage of the reaction while removing resulting methanol by fractional distillation. As the reaction proceeds, the boiling temperature of the solution increases gradually, which leads to an increase in reaction rate.

After step 1, the reaction solution is sampled to measure the molar ratio between the —OH and —OCH₃ functional groups. That is, before the reaction solution is heated under reduced pressure in step 2, a portion of the DMC remaining unreacted and the methanol by-product are removed from the sample of the reaction solution under reduced pressure at high temperature, and thereafter, the molar ratio can be determined by ¹H NMR spectroscopy. The molar ratio between the —OH and —OCH₃ functional group can be empirically adjusted to 1:1-1.3 by varying the reaction time and the initial molar ratio of the DMC/HO-A-OH depending on the conditions of the reactor, the kind and amount of the base catalyst, and the amount of the diol added. For example, the molar ratio of the —OH functional groups to the —OCH₃ functional groups can be adjusted to 1:1-1.3 by the following procedure. First, the DMC and HO-A-OH in a molar ratio of DMC/HO-A-OH=1.5 are added to a reactor and a predetermined amount of the catalyst is added thereto. The reactor is immersed in an oil bath at 120° C. After the reaction is carried out for 1 hour, methanol as a by-product and unreacted DMC are removed. The molar ratio between the —OH and —OCH₃ functional groups in the remaining mixture is analyzed by NMR. If the molar ratio is observed to be 1:1.4, the reaction time is shortened or the initial molar ratio of the DMC/HO-A-OH is adjusted to a lower value than 1.5. The above procedure is repeated until the molar ratio (—OH:—CH₃) reaches 1:1.4 or less, finally 1:1-1.3. These empirically determined conditions can be continuously applied to the reactor.

After the molar ratio between the —OH and —OCH₃ functional groups is set to be close to 1:1 through the reaction in step 1, a condensation reaction of the reaction mixture is allowed to proceed via Reaction 1a rather than Reactions 1b and 1c under heat and reduced pressure in step 2. As a result, r in Carothers equation can be fixed at 1. At this time, when the conversion rate is increased sufficiently, a sufficiently high DP of the polymer can be achieved. In the early stage of step 2, the pressure and temperature of the reactor are maintained at relatively low levels. Under these conditions, the diol compound remains unremoved in the reaction system so that Reaction 1c can be avoided. Nevertheless, Reaction 1b cannot be avoided in a state in which considerable amounts of methoxy and alcohol groups are present in the early stage of step 2. That is, DMC, together with methanol, is removed due to its low boiling point (90° C.), resulting in a reduction in the number of methoxy groups. For this reason, it is preferred that the molar ratio between the —OH and —OCH₃ functional groups is set to a value slightly greater than 1:1 in step 1.

For a maximum conversion rate of the reaction, it is advantageous that the temperature is maintained as high as possible under high vacuum in the late stage of step 2. The present inventors were aware that the rates of Reactions 1b and 1c are much slower than the rate of Reaction 1a in the final step (Comparative Examples 1 and 2). When both —OH and —OCH₃ functional groups remain in the late stage of step 2, the conversion rate of the reaction can be increased by Reaction 1a, resulting in an increase in molecular weight. Alternatively, when either only —OH functional groups remain and the —OCH₃ functional groups are exhausted or only —OCH₃ functional groups remain and the —OH functional groups are exhausted in the late stage of step 2, the conversion rate can be increased while removing the diol formed by Reaction 1c under high vacuum at high temperature, resulting in an increase in molecular weight. In contrast, if the —OH functional groups are exhausted and only —OCH₃ functional groups remain in the late stage of step 2, it is difficult to increase the conversion rate of the reaction because of the low rates of Reactions 1b and 1c, making it difficult to increase the molecular weight of the final polymer. That is, if the molar ratio between the —OH and —OCH₃ functional groups is set to 1:<1 in step 1, only —OH functional groups remain and the —OCH₃ functional groups are exhausted in step 2. Even in this case, however, it is difficult to effectively increase the molecular weight of the final polymer, which is explained by the lower rate of Reaction 1c than that of Reaction 1a. As a consequence, a relatively low molecular weight of the final polymer is obtained (see Comparative Example 2). It was also found that when the molar ratio between the —OH and —OCH₃ functional groups is set to 1:>1.3 in step 1, only —OH functional groups are exhausted and the —OCH$_3$ functional groups remain in step 2. In this case, it is difficult to remove the —OCH$_3$ functional groups, making it difficult to increase the molecular weight of the final polymer (see Comparative Example 1).

The method of the present invention facilitates the preparation of an aliphatic polycarbonate having a weight average molecular weight of at least 50,000. Particularly, the method is very effective when the HO-A-OH is 1,4-butanediol, 1,6-hexanediol or a mixture thereof.

The most important feature of the present invention is based on the finding that when a diester or diol compound having an aromatic ring is further added in Reaction 3 shown in the Background Art, an aliphatic polycarbonate copolymer having a very high molecular weight can be prepared.

According to another aspect of the present invention, there is provided a method for preparing a high molecular weight aliphatic polycarbonate copolymer including the repeating units of Formula 1 in an effective manner. The method includes the following two steps. In step 1, a mixture of HO-A-OH, a dialkyl carbonate, and an aromatic diester is heated to or above the boiling point of the dialkyl carbonate in the presence of a base catalyst. At this time, the condensation reactions are carried out while removing alcohol by-products. Next, the reaction product of step 1 is allowed to react while distilling off volatiles under reduced pressure at high temperature to maximize the conversion rate of the reaction.

For a maximum conversion rate of the reaction, the molar ratio of the hydroxyl groups to the alkoxy groups in the product of step 1 is controlled to 1:≥1 such that the molar ratio of the hydroxyl groups to the alkoxy groups is maintained close to 1:1 in the reaction of step 2, allowing the final copolymer to have a weight average molecular weight of at least 50,000.

Herein, A is a substituted or unsubstituted C$_3$-C$_{60}$ alkylene or a substituted or unsubstituted C$_3$-C$_{60}$ heteroalkylene and the polymer includes the repeating units represented by Formula 1.

Each alkyl group of the dialkyl carbonate may be selected from the group consisting of methyl, ethyl, propyl, and combinations thereof.

For a high degree of polymerization of the final polymer, the molar ratio of the hydroxyl groups to the alkoxy groups is controlled to 1:1-1.3 in step 1.

In a preferred embodiment, the method includes reacting a mixture of HO-A-OH, including HO-A-O$^-$M$^+$, MeOC(O)—B—C(O)OMe, and DMC by heating to or above 90° C. while distilling off by-produced methanol and a portion of the DMC to obtain a mixture in which the molar ratio of the —OH functional groups to the —OCH$_3$ functional groups is 1:1-1.3 (step 1); and reacting the mixture while removing volatiles under reduced pressure at an elevated temperature of at least 150° C. to maximize the conversion rate of the reaction (step 2). As a result, the aliphatic polycarbonate copolymer has a weight average molecular weight of at least 50,000 and includes the repeating units of Formula 1.

Herein, A and B are as defined in Formula 1, M$^+$ is an alkali metal cation or an ammonium cation, and the molar ratio of HO-A-OH:M$^+$ is 100:0.1-1. The molar ratio of HO-A-OH:MeOC(O)—B—C(O)OMe corresponds to x:y in Formula 1. Preferably, each alkyl group of the dialkyl carbonate is selected from the group consisting of methyl, ethyl, propyl, and combinations thereof.

As can be seen from the following Examples Section, the addition of the aromatic diester compound enables the preparation of high molecular weight copolymers. In one embodiment, the HO-A-OH is 1,4-butanediol, the MeOC(O)—B—C(O)OMe is dimethyl terephthalate, and the molar ratio of HO-A-OH:MeOC(O)—B—C(O)OMe is 1:1-50. According to this embodiment, copolymers having a very high weight average molecular weight of at least 50,000 can be prepared in a more effective manner.

Effects of the Invention

Various embodiments of the present invention provide aliphatic polycarbonates having a weight average molecular weight of at least 50,000 prepared by condensation of a dimethyl carbonate and an aliphatic diol, and methods for preparing the copolymers. The present inventors have also found that when a diester compound having an aromatic ring is further added during the condensation reaction, a copolymer having a higher molecular weight can be prepared. The higher molecular weight copolymer is a compound having a novel structure, which has not previously been published, and is thus expected to find application in various fields.

Aliphatic polycarbonates are biodegradable and dimethyl carbonate used for the preparation of aliphatic polycarbonates can be produced using carbon dioxide as a raw material. Accordingly, such aliphatic polycarbonates are considered eco-friendly. Some crystalline aliphatic polycarbonates are very attractive in achieving desired physical properties. Until now, however, many problems have been encountered in the preparation of high molecular weight aliphatic polycarbonates. Under such circumstances, low molecular weight aliphatic polycarbonate-diols are used for polyurethane production. The present invention paves the way for the preparation of eco-friendly high molecular weight aliphatic polycarbonates that can be commercialized through their various application developments.

BRIEF DESCRIPTION OF THE DRAWINGS

FIG. 1 is a $^1$H NMR spectrum of a copolymer having a weight average molecular weight of 149,000, which was prepared by condensation of 1,4-butanediol, dimethyl terephthalate, and dimethyl carbonate in Example 6 (1,4-butanediol:dimethyl terephthalate=100:2).

MODE FOR CARRYING OUT THE INVENTION

The effects of the present invention will be explained in detail with reference to the following examples, including comparative examples. However, these examples are provided for illustrative purposes only and are not intended to limit the scope of the invention.

Examples 1-3

Condensation Reaction of 1,4-butanediol and Dimethyl Carbonate

A base was added to 1,4-butanediol (10.0 g, 110 mmol) in a 3-neck flask to form HO(CH$_2$)$_4$O$^-$M$^+$, and then dimethyl carbonate (DMC, 15.0 g, 167 mmol) was added thereto. A mechanical stirrer was connected to one neck of the flask, a manifold attached with a vacuum line and a nitrogen line was connected to another neck of the flask, and a distillation unit was connected to the remaining neck of the flask. After the reaction flask was immersed in a thermostatic bath at 120° C., the reaction was carried out for 1 h while distilling off formed methanol and a portion of the DMC at ambient pressure. A slight amount of the reaction mixture was sampled. After removal of methanol and unreacted DMC from the sample at room temperature, the molar ratio between —OH and —OCH$_3$ functional groups was determined by $^1$H NMR analysis. The reaction was continued for 2 h while removing volatiles at an elevated temperature of 180° C. and a reduced pressure of 250 mmHg. Thereafter, the reaction was continued at 180° C. for additional 2 h while removing volatiles under a high vacuum of 0.3 mmHg, which was maintained using a vacuum pump. The condensation reaction was further carried out at an elevated temperature of 190° C. for 2 h. THF was not formed at 190° C. but was observed at 200° C. During the reaction, portions of the formed oligomer and cyclic compounds were condensed as solids at the top end of the reactor or on the wall surface of the distillation unit. In the final stage of the reaction, the solid compounds deposited at the top end of the reactor were heated and vaporized using a heat gun and they were condensed on the wall surface of the distillation unit. After cooling to 100° C., a solution of terephthaloyl chloride in 1 mL THF was added to the flask. The terephthaloyl chloride was used in an amount corresponding to half the equivalents of the base. For neutralization, the resulting mixture was stirred at ambient pressure and 160° C. for 1 h. The polymer compound formed in the flask was dissolved in methylene chloride and transferred to a one-neck flask. After removal of the methylene chloride under reduced pressure, the product was dried in an oven at 80° C. for 1 h. The yield of the product was measured. As a result of $^1$H NMR analysis, two strong signals with a 1:1 intensity ratio were observed at 4.15 ppm and 1.77 ppm. Very weak signals corresponding to the terminal —CH$_2$OH and —OH groups were observed at 3.68 ppm and 3.77 ppm, respectively. The results of polymerization are shown in Table 1.

Comparative Examples 1-2

Condensation reaction of 1,4-butanediol and dimethyl carbonate (after reaction at 120° C. for 1 h, the molar ratio between —OH and —OCH$_3$ functional groups was outside the range of 1:1 to 1:1.3)

The procedure of Example 1 was repeated except that DMC was added in different amounts of 17.5 g (194 mmol) in Comparative Example 1 and 14.0 g (155 mmol) in Comparative Example 2. In Comparative Example 1, the reaction was carried out at 180° C. for 2 h while removing volatiles under a high vacuum (0.3 mmHg), which was maintained using a vacuum pump. Assuming that the integrated intensity of the peak corresponding to the —OC(O)OCH$_2$— groups in the polymer chain was defined as 100, the intensity of the peak corresponding to the terminal —OCH$_3$ groups observed at 3.79 ppm was 1.89 and the peak corresponding to the terminal —CH$_2$OH groups was not observed. After the reaction was continued at 190° C. for additional 1 h, the intensity of the peak corresponding to the terminal —OCH$_3$ groups was reduced to 1.49. After the reaction was further continued for 1 h, the intensity of the peak corresponding to the terminal —OCH$_3$ groups was reduced to 1.18. These results indicate that the —OCH$_3$ groups were decreased very slowly. In Comparative Example 2, the reaction was carried out at 180° C. for 2 h while removing volatiles under a high vacuum (0.3 mmHg), which was maintained using a vacuum pump. Assuming that the integrated intensity of the peak corresponding to the —OC(O)OCH$_2$— groups in the polymer chain was defined as 100, the intensity of the peak corresponding to the terminal —CH$_2$OH groups was 1.93 and that of the peak corresponding to the terminal —OCH$_3$ groups was very small (0.12). After the reaction was continued at 190° C. for additional 2 h, the peak corresponding to the —OCH$_3$ groups disappeared but the intensity of the peak corresponding to the terminal —OCH$_3$ groups was somewhat reduced to 1.11. These results indicate that the reaction rate was very low. The results of polymerization are shown in Table 1.

TABLE 1

Results of condensation reaction between 1,4-butanediol and dimethyl carbonate

| | Base/mol % relative to BD | [OCH$_3$]/ [OH]$^a$ | Yield$^b$ (%) | M$_w$$^c$ × 10$^{-3}$ | M$_n$/ M$_w$$^c$ |
|---|---|---|---|---|---|
| Example 1 | NaH/0.20 | 1.05 | 82 | 77 | 1.50 |
| Example 2 | KH/0.20 | 1.01 | 82 | 56 | 1.62 |
| Example 3 | [Bu$_4$N]$^+$OH$^-$/0.20 | 1.01 | 82 | 78 | 1.54 |
| Comparative Example 1 | NaH/0.20 | 1.0:1.38 | 87 | 45 | 1.56 |
| Comparative Example 2 | NaH/0.20 | 1.0:0.82 | 80 | 47 | 1.53 |

$^a$Molar ratio between —OCH$_3$/—OH functional groups, which was measured by $^1$H NMR analysis after 1-h reaction while removing methanol under ambient pressure at 120° C.
$^b$Value calculated from the mass of the obtained polymer relative to that of 1,4-butanediol added.
$^c$Value measured on the basis of polystyrene standard in THF at 40° C. by GPC.

Example 4

Condensation Reaction Between 1,6-hexanediol and Dimethyl Carbonate

The procedure of Example 1 was repeated except that an equimolar amount of 1,6-hexanediol was added instead of 1,4-butanediol. As a result of $^1$H NMR analysis, three strong signals with a 1:1:1 intensity ratio were observed at 4.11 ppm, 1.68 ppm, and 1.41 ppm. A peak corresponding to the terminal —CH$_2$OH groups was observed at 3.64 ppm and a very weak peak corresponding to the terminal —OCH$_3$ groups was observed at 3.64 ppm. The results of polymerization are shown in Table 2.

TABLE 2

Results of condensation reaction between 1,6-hexanediol and dimethyl carbonate

| [OCH$_3$]/[OH] | Yield (%) | M$_w$ × 10$^{-3}$ | M$_n$/M$_w$ |
|---|---|---|---|
| 1.28 | 95 | 127 | 1.81 |

Examples 5-11

Condensation Reactions Between 1,4-butanediol and Dimethyl Carbonate Under Addition of Aromatic Diesters The procedure of Example 1 was repeated except that the dimethyl esters derived from the dicarboxylic acids of Formulae 3a to 3d were further added and the amount of DMC added was changed depending on the amounts of the dimethyl esters. DMC was used in amounts of 15.5 g (194 mmol) in Examples 5-6 and 9-11 and 15.0 g (167 mmol) in Examples 7-8. The results of polymerization are shown in Table 3. $^1$H NMR analysis revealed that the diester groups were introduced into the polymer chains. In each spectrum, two strong signals with a 1:1 intensity ratio were observed at 4.15 ppm and 1.77 ppm, very small signals corresponding to the terminal —CH$_2$OH and —OCH$_3$ groups were observed at 3.68 ppm and 3.77 ppm, respectively, an additional signal corresponding to the diester was observed. When dimethyl terephthalate as the dimethyl ester derived from Formula 3a was further added, a triplet signal corresponding to CH$_2$—O was further observed at 4.39 ppm and a signal corresponding to the benzene ring was further observed at 8.10 ppm in the $^1$H NMR spectrum. The integrated intensities of the peaks matched the amount of the dimethyl ester added. When dimethyl isophthalate as the dimethyl ester derived from Formula 3b was further added, a triplet signal corresponding to CH$_2$—O was further observed at 4.40 ppm and a singlet signal, a doublet signal, and a triplet signal corresponding to the benzene ring were further observed at 8.66 ppm, 8.22 ppm, and 7.54 ppm, respectively, in the $^1$H NMR spectrum. The integrated intensities of the peaks matched the amount of the dimethyl ester added. When dimethyl phthalate as the dimethyl ester derived from Formula 3c was further added, a triplet signal corresponding to CH$_2$—O was further observed at 4.33 ppm and signals corresponding to the benzene ring in an AA'BB' pattern were further observed at 7.71 and 7.53 ppm in the $^1$H NMR spectrum. The integrated intensities of the peaks matched the amount of the dimethyl ester added. When 2,6-dimethyl naphthalene carboxylate as the dimethyl ester derived from Formula 3d was further added, a triplet signal corresponding to CH$_2$—O was further observed at 4.43 ppm and singlet, doublet, and doublet signals corresponding to the naphthalene ring were further observed at 8.61 ppm, 8.11 ppm, and 8.01 ppm, respectively, in the $^1$H NMR spectrum. The integrated intensities of the peaks matched the amount of the dimethyl ester added.

Examples 12-19

Condensation Reactions Between 1,4-butanediol and Dimethyl Carbonate Under Addition of Large Amounts (10-50 mol %) of Aromatic Diesters The procedure of Examples 5-11 was repeated except that the dimethyl esters derived from the dicarboxylic acids of Formulae 3a and 3c were further added and the amount of DMC added was changed depending on the amounts of the dimethyl esters. DMC was used in amounts of 11.0 g (122 mmol) in Examples 12 and 18, 9.50 g (105 mmol) in Examples 13 and 19, 8.00 g (88.8 mmol) in Example 14, 14.5 g (161 mmol) in Example 15, 13.5 g (150 mmol) in Example 16, and 13.0 g (144 mmol) in Example 17. After the flask containing 1,4-butanediol (10.0 g, 110 mmol), DMC, and the dimethyl ester was immersed in a thermostatic bath at 120° C., the reaction was carried out for 1 h while removing formed methanol and a portion of the DMC at ambient pressure. After heating to 190° C., the reaction was continued while removing volatiles under a reduced pressure of 570 mmHg for 30 minutes, under a reduced pressure 380 mmHg for 1 h, and under a reduced pressure 190 mmHg for 2 h. Thereafter, the reaction was continued at 190° C. while removing volatiles under a high vacuum of 0.3 mmHg, which was maintained using a vacuum pump. The reaction was further allowed to react under a high vacuum for 2 h in Examples 12 and 15-19, for 6 h in Example 13, and for 8 h in Example 14. The results of polymerization are shown in Table 3.

TABLE 3

Results of condensation reactions between 1,4-butanediol (BD and dimethyl carbonate under addition of aromatic diesters

| | Aromatic ester | BD:ester | [OCH$_3$]/[OH]$^a$ | Yield$^b$ (%) | M$_w^c$ × 10$^{-3}$ | M$_n$/M$_w^c$ | T$_m$ (° C.) |
|---|---|---|---|---|---|---|---|
| Example 5 | Formula 3a | 100:1.0 | 1.06 | 82 | 151 | 1.54 | 51 |
| Example 6 | Formula 3a | 100:2.0 | 1.15 | 80 | 149 | 1.65 | 48 |
| Example 7 | Formula 3a | 100:5.0 | 1.16 | 84 | 146 | 1.61 | 44 |
| Example 8 | Formula 3a | 100:10 | 1.23 | 75 | 153 | 1.65 | |
| Example 9 | Formula 3b | 100:2.0 | 1.20 | 75 | 177 | 1.64 | 48 |
| Example 10 | Formula 3c | 100:2.0 | 1.19 | 77 | 100 | 1.56 | |
| Example 11 | Formula 3d | 100:2.0 | 1.29 | 86 | 131 | 1.67 | |
| Example 12 | Formula 3a | 100:30 | 1.06 | 85 | 65 | 1.64 | 94 |
| Example 13 | Formula 3a | 100:40 | 1.06 | 90 | 81 | 1.67 | 120 |
| Example 14 | Formula 3a | 100:50 | 1.06 | 92 | 61 | 1.62 | 144 |
| Example 15 | Formula 3c | 100:10 | 1.16 | 91 | 82 | 1.65 | |
| Example 16 | Formula 3c | 100:15 | 1.16 | 87 | 71 | 1.57 | |
| Example 17 | Formula 3c | 100:20 | 1.16 | 93 | 87 | 1.66 | |
| Example 18 | Formula 3c | 100:30 | 1.16 | 87 | 55 | 1.66 | |
| Example 19 | Formula 3c | 100:40 | 1.14 | 85 | 51 | 1.59 | |

$^a$Molar ratio between —OCH$_3$/—OH functional groups, which was measured by $^1$H NMR analysis after 1-h reaction while removing methanol under ambient pressure at 120° C.
$^b$Value calculated from the mass of the obtained polymer relative to the total mass of 1,4-butanediol and diester added.
$^c$Value measured on the basis of polystyrene standard in THF at 40° C. by GPC.
$^d$Glass transition temperature and melting point measured by DSC.

Example 20

Condensation Reaction Between 1,6-hexanediol and Dimethyl Carbonate Under Addition of Dimethyl Terephthalate The procedure of Example 1 was repeated except that an equimolar amount of 1,6-hexanediol was added instead of 1,4-butanediol. The molar ratio of the 1,6-hexanediol to the dimethyl terephthalate was 100:2.0. The results of polymerization are shown in Table 4. As a result of $^1$H NMR analysis, three strong signals with a 1:1:1 intensity ratio were observed at 4.11 ppm, 1.67 ppm, and 1.41 ppm, a signal corresponding to the terminal —CH$_2$OH groups was observed at 3.64 ppm, and a very weak signal corresponding to the terminal —OCH$_3$ groups was observed at 3.77 ppm. For the dimethyl terephthalate, a triplet signal corresponding to CH$_2$—O was further observed at 4.33 ppm and a signal corresponding to the benzene ring was further observed at 8.04 ppm in the $^1$H NMR spectrum. The integrated intensities of the peaks matched the amount of the dimethyl terephthalate added.

TABLE 4

Results of condensation reaction between 1,4-hexanediol and dimethyl carbonate under addition of dimethyl terephthalate

| [OCH$_3$]/[OH]$^a$ | Yield (%) | M$_w$ × 10$^{-3}$ | M$_n$/M$_w$ |
|---|---|---|---|
| 1.30 | 92 | 220 | 1.82 |

The invention claimed is:

1. An aliphatic polycarbonate copolymer comprising repeating units of Formula 1:

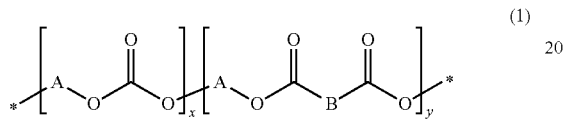

wherein A is a substituted or unsubstituted C$_3$-C$_{60}$ alkylene or a substituted or unsubstituted C$_3$-C$_{60}$ heteroalkylene and the O-A-O units in one polymer chain are identical to or different from each other, B is a substituted or unsubstituted C$_5$-C$_{20}$ arylene or a substituted or unsubstituted C$_5$-C$_{20}$ heteroarylene and the —C(O)—B—C(O)— units in one polymer chain are identical to or different from each other, and x and y are real numbers representing mole fraction.

2. The aliphatic polycarbonate copolymer according to claim 1, wherein the aliphatic polycarbonate copolymer has a weight average molecular weight of at least 50,000.

3. The aliphatic polycarbonate copolymer according to claim 1, wherein the aliphatic polycarbonate copolymer has a weight average molecular weight of at least 100,000.

4. The aliphatic polycarbonate copolymer according to claim 1, wherein the mole fraction of y(y/(x+y)) is from 1% to 50%.

5. The aliphatic polycarbonate copolymer according to claim 4, wherein the aliphatic polycarbonate copolymer is prepared by condensation of HO-A-OH, as an aliphatic diol, selected from compounds of Formulae 2a to 2d:

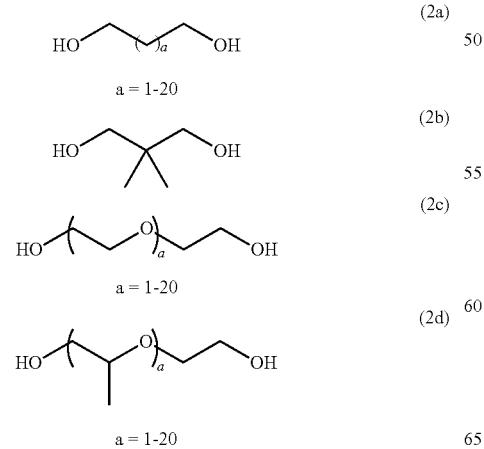

with HO$_2$C—B—CO$_2$H, as a raw material for an aromatic diester, selected from the compounds of Formulae 3a to 3d:

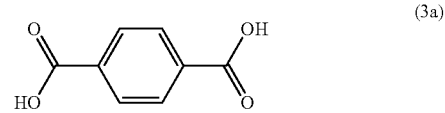

(3a)

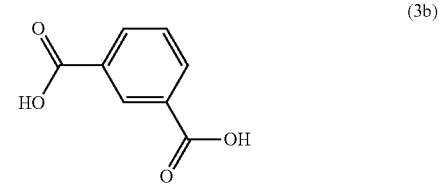

(3b)

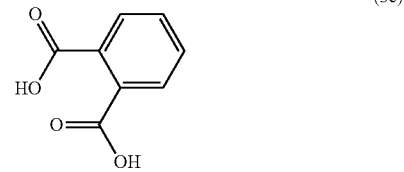

(3c)

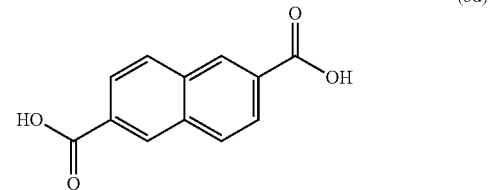

(3d)

6. The aliphatic polycarbonate copolymer according to claim 5, wherein the HO-A-OH is 1,4-butanediol and the HO$_2$C—B—CO$_2$H is terephthalic acid.

7. A method for preparing an aliphatic polycarbonate, comprising:
    condensing a mixture of HO-A-OH and a dialkyl carbonate in the presence of a base catalyst while removing an alcohol by-product by heating to or above the boiling point of the dialkyl carbonate (step 1); and
    reacting the reaction product of step 1 while distilling off volatiles by distillation under reduced pressure at high temperature to maximize the conversion rate of the reaction (step 2),
    wherein the conversion rate is maximized by controlling the molar ratio of the hydroxyl groups to the alkoxy groups in the reaction product of step 1 to 1:1-1.3 such that the molar ratio between the hydroxyl groups and the alkoxy groups is maintained close to 1:1 in the reaction of step 2 to allow the final polymer to have a weight average molecular weight of at least 50,000, and
    wherein A is a substituted or unsubstituted C$_3$-C$_{60}$ alkylene or a substituted or unsubstituted C$_3$-C$_{60}$ heteroalkylene, the final polymer comprises repeating units having a structure represented by —[OC(O)O-A]-, and the O-A-O units in one polymer chain are identical to or different from each other.

8. The method according to claim 7, wherein each alkyl group of the dialkyl carbonate is selected from the group consisting of methyl, ethyl, propyl, and combinations thereof.

9. The method according to claim 7, wherein, in step 1, a mixture of the HO-A-OH, comprising HO-A-O$^-$M$^+$, and dimethyl carbonate (DMC) is condensed by heating to 90°

C. or more while distilling off by-produced methanol and a portion of the DMC, and, in step 2, the condensation product of step 1 is condensed while removing volatiles under reduced pressure at an elevated temperature of at least 150° C. to maximize the conversion rate of the reaction, and
   wherein $M^+$ is an alkali metal cation or an ammonium cation, and the molar ratio of HO-A-OH:$M^+$ is 100: 0.1-1.

10. The method according to claim 9, wherein the HO-A-OH is 1,4-butanediol, 1,6-hexanediol or a mixture thereof.

11. A method for preparing an aliphatic polycarbonate copolymer, comprising:
   condensing a mixture of HO-A-OH, a dialkyl carbonate, and an aromatic diester in the presence of a base catalyst while removing alcohol by-products by heating to or above the boiling point of the dialkyl carbonate (step 1); and
   reacting the reaction product of step 1 while distilling off volatiles under reduced pressure at high temperature to maximize the conversion rate of the reaction (step 2),
   wherein the conversion rate is maximized by controlling the molar ratio of the hydroxyl groups to the alkoxy groups in the reaction product of step 1 to 1:≥1 such that the molar ratio between the hydroxyl groups and the alkoxy groups is maintained close to 1:1 in the reaction of step 2 to allow the final copolymer to have a weight average molecular weight of at least 50,000, and
   wherein A is a substituted or unsubstituted $C_3$-$C_{60}$ alkylene or a substituted or unsubstituted $C_3$-$C_{60}$ heteroalkylene and the final copolymer comprises the repeating units of Formula 1 described in claim 1.

12. The method according to claim 11, wherein each alkyl group of the dialkyl carbonate is selected from the group consisting of methyl, ethyl, propyl, and combinations thereof.

13. The method according to claim 11, wherein the molar ratio of the alkoxy groups to the hydroxyl groups is controlled to 1:1-1.3 in step 1.

14. The method according to claim 11, wherein, in step 1, a mixture of HO-A-OH, comprising HO-A-O$^-$M$^+$, MeOC(O)—B—C(O)OMe, and dimethyl carbonate (DMC) is allowed to react by heating to or above 90° C. while distilling off by-produced methanol and a portion of the DMC to obtain a mixture in which the molar ratio of the —OH functional groups to the —OCH$_3$ functional groups is 1:1-1.3, and in step 2, the mixture is allowed to react while removing volatiles under reduced pressure at an elevated temperature of at least 150° C. to obtain the final polymer, and
   wherein A and B are as defined in Formula 1 described in claim 1, $M^-$ is an alkali metal cation or an ammonium cation, and the molar ratio of HO-A-OH:$M^+$ is 100: 0.1-1.

15. The method according to claim 14, wherein the HO-A-OH is 1,4-butanediol, the MeOC(O)—B—C(O)OMe is dimethyl terephthalate, and the molar ratio of HO-A-OH: MeOC(O)—B—C(O)OMe is 1:1-50.

* * * * *